(12) United States Patent
Wang

(10) Patent No.: US 10,443,757 B1
(45) Date of Patent: Oct. 15, 2019

(54) FAUCET

(71) Applicant: Hsiang-Shih Wang, Changhua (TW)

(72) Inventor: Hsiang-Shih Wang, Changhua (TW)

(73) Assignee: GEANN INDUSTRIAL CO. LTD., Changhua (TW)

( * ) Notice: Subject to any disclaimer, the term of this patent is extended or adjusted under 35 U.S.C. 154(b) by 10 days.

(21) Appl. No.: 15/953,480

(22) Filed: Apr. 15, 2018

(51) Int. Cl.
*F16K 31/44* (2006.01)
*F16K 11/00* (2006.01)

(52) U.S. Cl.
CPC ............ *F16K 31/44* (2013.01); *F16K 19/006* (2013.01)

(58) Field of Classification Search
USPC ......................................................... 137/801
See application file for complete search history.

(56) References Cited

U.S. PATENT DOCUMENTS

| | | | | |
|---|---|---|---|---|
| 2,726,120 A * | 12/1955 | Bletcher | ................... | B05B 1/18 239/449 |
| 2,837,374 A * | 6/1958 | Lipman | ................. | B05B 7/0433 137/625.25 |
| 3,231,236 A * | 1/1966 | Hodel | ....................... | F16K 3/26 251/284 |
| 3,387,816 A * | 6/1968 | Holycross | ................. | F16K 3/02 137/119.01 |
| 3,632,083 A * | 1/1972 | Meeks | ............... | A61C 17/0202 251/282 |
| 3,682,392 A * | 8/1972 | Kint | .......................... | E03C 1/08 239/428.5 |
| 4,134,573 A * | 1/1979 | Messinger | ................. | E03C 1/08 251/324 |
| 5,096,503 A * | 3/1992 | Wellman | ................. | A61F 5/445 134/167 R |
| 6,557,587 B1 * | 5/2003 | Chiu | ......................... | E03C 1/04 137/801 |
| 9,533,321 B2 * | 1/2017 | Yu | ............................. | B05B 9/01 |

* cited by examiner

*Primary Examiner* — Jessica Cahill
*Assistant Examiner* — Daphne M Barry
(74) *Attorney, Agent, or Firm* — Che-Yang Chen; Law offices of Scott Warmuth

(57) ABSTRACT

A faucet may comprise a main body, a control valve, and two press buttons. The main body is hollow to form a valve chamber therein, and the control valve is configured to be positioned in the valve chamber. A top end of the main body is connected to a water outlet tube, and a lower end thereof is configured to axially insert into the valve chamber. After the control valve is positioned in the valve chamber, a locking ring is engaged with and secured at a lower end of the valve chamber, and a water inlet tube is configured to axially penetrate through the locking ring to connect to the control valve. Each of two lateral sides of the main body has an installing hole, and two installing holes located at two corresponding positions are configured to receive and couple with the two press buttons respectively.

10 Claims, 8 Drawing Sheets

FAUCET

FIELD OF THE INVENTION

The present invention relates to a faucet and more particularly to a faucet that is turned on/off by pressing.

BACKGROUND OF THE INVENTION

Generally, a conventional faucet has a main body (40), and a bottom portion and a top portion thereof respectively have a water inlet chamber and a water outlet chamber for connecting a water inlet tube (41) and a water outlet tube (42) (as shown in FIGS. 7 and 8). Moreover, a valve room (401) is communicated with and formed at a lateral side of the main body (40) for accommodating a control valve (43), and the control valve (43) is connected to and turned on/off by a handle (44). The filtered water can flow from the water inlet tube (41) through the main body (40) and out of the faucet from the water outlet tube (42).

However, the conventional faucet is disadvantageous because: (i) the handle (44) is connected to the lateral side of the main body (40), which leads that more space is required for installation; and (ii) after the main body (40) is manufactured, an additional process for manufacturing the valve room (401) is required, which increases the costs of time and effort. Therefore, there remains a need for a new and improved design for a faucet to overcome the problems presented above.

SUMMARY OF THE INVENTION

The present invention provides a faucet which comprises a main body, a control valve, a first press button and a second press button. The main body is hollow to form a valve chamber therein, and the control valve is configured to be positioned in the valve chamber. A neck portion having a smaller diameter than the valve chamber is connected to and communicated with an upper end of the valve chamber. A top end of the main body is connected to a water outlet tube, and a lower end of the water outlet tube is configured to axially insert through the neck portion into the valve chamber. After the control valve is positioned in the valve chamber, a locking ring is engaged with and secured at a lower end of the valve chamber. Moreover, a water inlet tube is configured to axially penetrate through the locking ring to connect to the control valve. Each of two lateral sides of the main body has an installing hole which is communicated with the valve chamber, and the two installing holes located at two corresponding positions are configured to receive and couple with the first press button and the second press button respectively. The control valve comprises a valve shell and a valve base which are configured to couple together, and a housing formed inside the valve shell is configured to accommodate an upper fixed valve piece, a driving valve piece and a lower fixed valve piece in sequence. A connecting tube upwardly extending from a top end of the valve shell is communicated with the housing, and each of two lateral sides of the valve shell has an opening, wherein the two openings are located at two corresponding positions. When the control valve is positioned in the valve chamber, the two openings are respectively aligned with the two installing holes, and the connecting tube is adapted to connect to the water outlet tube which is downwardly inserted into the valve chamber through the neck portion. Furthermore, the upper fixed valve piece is secured in the housing while the lower fixed valve piece is secured at a top surface of the valve base. A first through hole axially penetrates through a central portion of the valve base, and a second through hole and a third through hole respectively and axially penetrate through a central portion of the lower fixed valve piece and a central portion of the upper fixed valve piece, wherein the first through hole, the second through hole and the third through hole are aligned with each other. The upper fixed valve piece, the driving valve piece and the lower fixed valve piece are stacked in sequence, and the driving valve piece is configured to be located at a position horizontally aligned with the openings. A water channel is configured to axially penetrate through the driving valve piece at a lateral side of a center axis of the driving valve piece. Each of the first press button and the second press button has a first end and a second end, and an outer periphery of the second end comprises a plurality of positioning portions. Moreover, the first press button and the second press button are configured to respectively connect to the two installing holes of the main body through the positioning positions on the two second ends thereof. The first press button or the second press button is selectively pressed through the first end thereof to enable the second end to pass through the opening at the same lateral side, and the second end is adapted to push and shift the driving valve piece to enable the water channel of the driving valve piece to partially align, completely align, or misalign with the second through hole of the lower fixed valve piece and the third through hole of the upper fixed valve piece simultaneously, thereby turning on/off and controlling the water amount of the faucet in the present invention.

Comparing with conventional faucet, the present invention is advantageous because: the faucet is operated through the first press button and the second press button, which reduces space required for installation; (ii) after manufacturing of the main body, there is no need to have an additional process for the valve room, which reduces the cost and labor; and (iii) the alignment between the water channel and the second through hole and the third through hole can be achieved through horizontally shifting the driving valve piece such that the manufacturer has no need to accurately calculate the rotation angles between the valve pieces, which makes the control valve easier to manufacture.

DETAILED DESCRIPTION OF THE INVENTION

Figure 1:
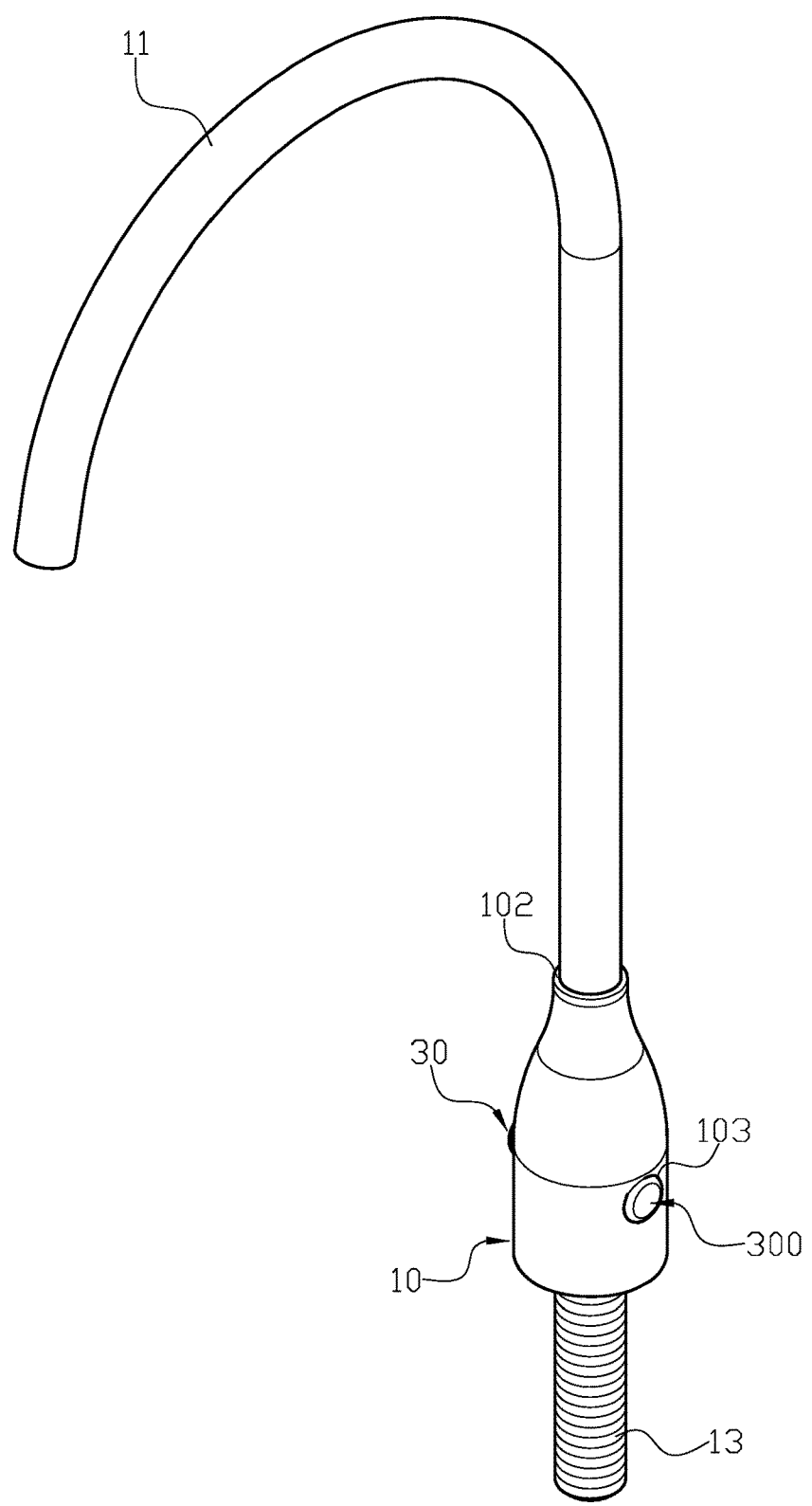
FIG. 1 is a three-dimensional assembly view of a faucet of the present invention.
Figure 2:
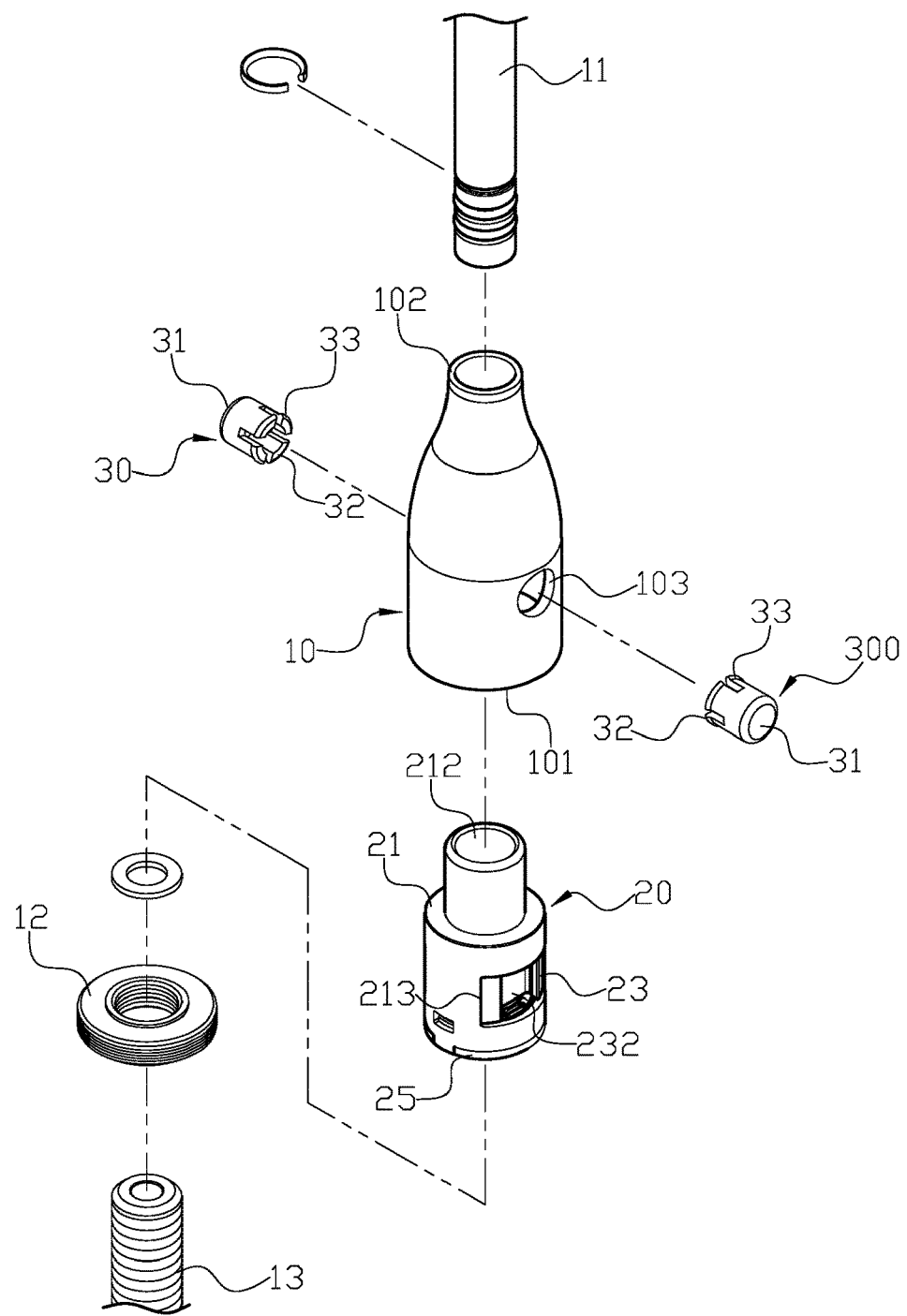
FIG. 2 is a three-dimensional exploded view of the faucet of the present invention.
Figure 3:
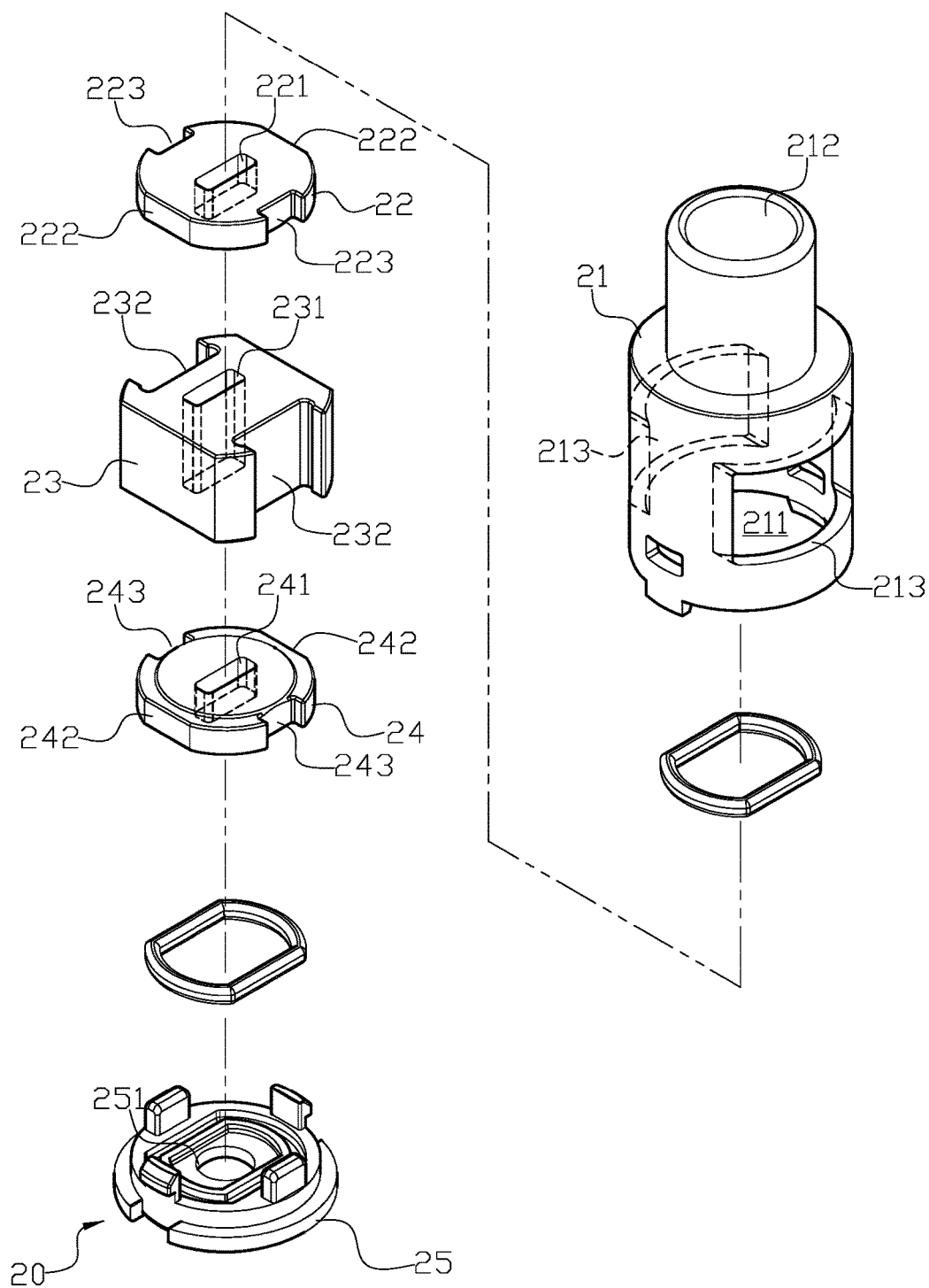
FIG. 3 is a detailed exploded view of a control valve of the faucet of the present invention.

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

In order to further understand the goal, characteristics and effect of the present invention, a number of embodiments along with the drawings are illustrated as following:

Referring to FIGS. 1 to 4, the present invention provides a faucet which comprises a main body (10), a control valve (20), a first press button (30) and a second press button (300). The main body (10) is hollow to form a valve chamber (101) therein, and the control valve (20) is configured to be positioned in the valve chamber (101). A neck portion (102) having a smaller diameter than the valve chamber (101) is connected to and communicated with an upper end of the valve chamber (101). A top end of the main body (10) is connected to a water outlet tube (11), and a lower end of the water outlet tube (11) is configured to axially insert through the neck portion (102) into the valve chamber (101). After the control valve (20) is positioned in the valve chamber (101), a locking ring (12) is engaged with and secured at a lower end of the valve chamber (101). Moreover, a water inlet tube (13) is configured to axially penetrate through the locking ring (12) to connect to the control valve (20). Each of two lateral sides of the main body (10) has an installing hole (103) which is communicated with the valve chamber (101), and the two installing holes (103) located at two corresponding positions are configured to receive and couple with the first press button (30) and the second press button (300) respectively. The control valve (20) comprises a valve shell (21) and a valve base (25) which are configured to couple together, and a housing (211) formed inside the valve shell (21) is configured to accommodate an upper fixed valve piece (22), a driving valve piece (23) and a lower fixed valve piece (24) in sequence. A connecting tube (212) upwardly extending from a top end of the valve shell (21) is communicated with the housing (211), and each of two lateral sides of the valve shell (21) has an opening (213), wherein the two openings (213) are located at two corresponding positions. When the control valve (20) is positioned in the valve chamber (101), the two openings (213) are respectively aligned with the two installing holes (103), and the connecting tube (212) is adapted to connect to the water outlet tube (11) which is downwardly inserted into the valve chamber (101) through the neck portion (102). Furthermore, the upper fixed valve piece (22) is secured in the housing (211) while the lower fixed valve piece (24) is secured at a top surface of the valve base (25). A first through hole (251) axially penetrates through a central portion of the valve base (25), and a second through hole (241) and a third through hole (221) respectively and axially penetrate through a central portion of the lower fixed valve piece (24) and a central portion of the upper fixed valve piece (22), wherein the first through hole (251), the second through hole (241) and the third through hole (221) are aligned with each other. The upper fixed valve piece (22), the driving valve piece (23) and the lower fixed valve piece (24) are stacked in sequence, and the driving valve piece (23) is configured to be located at a position horizontally aligned with the openings (213). A water channel (231) is configured to axially penetrate through the driving valve piece (23) at a lateral side of a center axis of the driving valve piece (23). Each of the first press button (30) and the second press button (300) has a first end (31) and a second end (32), and an outer periphery of the second end (32) comprises a plurality of positioning portions (33). Moreover, the first press button (30) and the second press button (300) are configured to respectively connect to the two installing holes (103) of the main body (10) through the positioning positions (33) on the two second ends (32) thereof. The first press button (30) or the second press button (300) is selectively pressed through the first end (31) thereof to enable the second end (32) to pass through the opening (213) at the same lateral side, and the second end (32) is adapted to push and shift the driving valve piece (23) to enable the water channel (231) of the driving valve piece (23) to partially align, completely align, or misalign with the second through hole (241) of the lower fixed valve piece (24) and the third through hole (221) of the upper fixed valve piece (22) simultaneously, thereby turning on/off and controlling the water amount of the faucet in the present invention.

In one embodiment, the water outlet tube (11) is formed in a gooseneck shape.

In another embodiment, an O-ring is disposed on an outer periphery of the lower end of the water outlet tube (11).

In still another embodiment, a locating ring made of polytetrafluoroethylene (PTFE) is disposed on an outer periphery of the lower end of the water outlet tube (11) to achieve the effects of wear-resisting and lubricating.

In a further embodiment, each of the water inlet tube (13) and the locking ring (12) comprises a threaded section, and the water inlet tube (13) and the locking ring (12) are engaged together through the threaded sections thereon.

In still a further embodiment, an outer edge of the upper fixed valve piece (22) has two first flat surfaces (222) and two first recesses (223) which enable the upper fixed valve piece (22) to be secured in the housing (211) of the valve shell (21).

In a preferred embodiment, an outer edge of the lower fixed valve piece (24) has two second flat surfaces (242) and two second recesses (243) which enable the lower fixed valve piece (24) to be secured at the top surface of the valve base (25).

In still a preferred embodiment, an outer edge of the driving valve piece (23) has two third recesses (232) at two corresponding positions, and two bottom surfaces of the two third recesses (232) are respectively provided to be abutted against by the second end (32) of the first press button (30) and the second end (32) of the second press button (300).

In an advantageous embodiment, three sealing rings are respectively disposed between the valve shell (21) and the upper fixed valve piece (22), between the lower fixed valve piece (24) and the valve base (25), and between the valve base (25) and the water inlet tube (13).

In still an advantageous embodiment, each of the third through hole (221), the water channel (231), and the second through hole (241) has an elongate cross section.

In a particular embodiment, each of the first press button (30) and the second press button (300) has a concave axially extending from the second end (32) toward the first end (31) thereof to form each of the first press button (30) and the second press button (300) in a cap shape, and the positioning portions (33) on the second end (32) are elastic claws.

Figure 4:
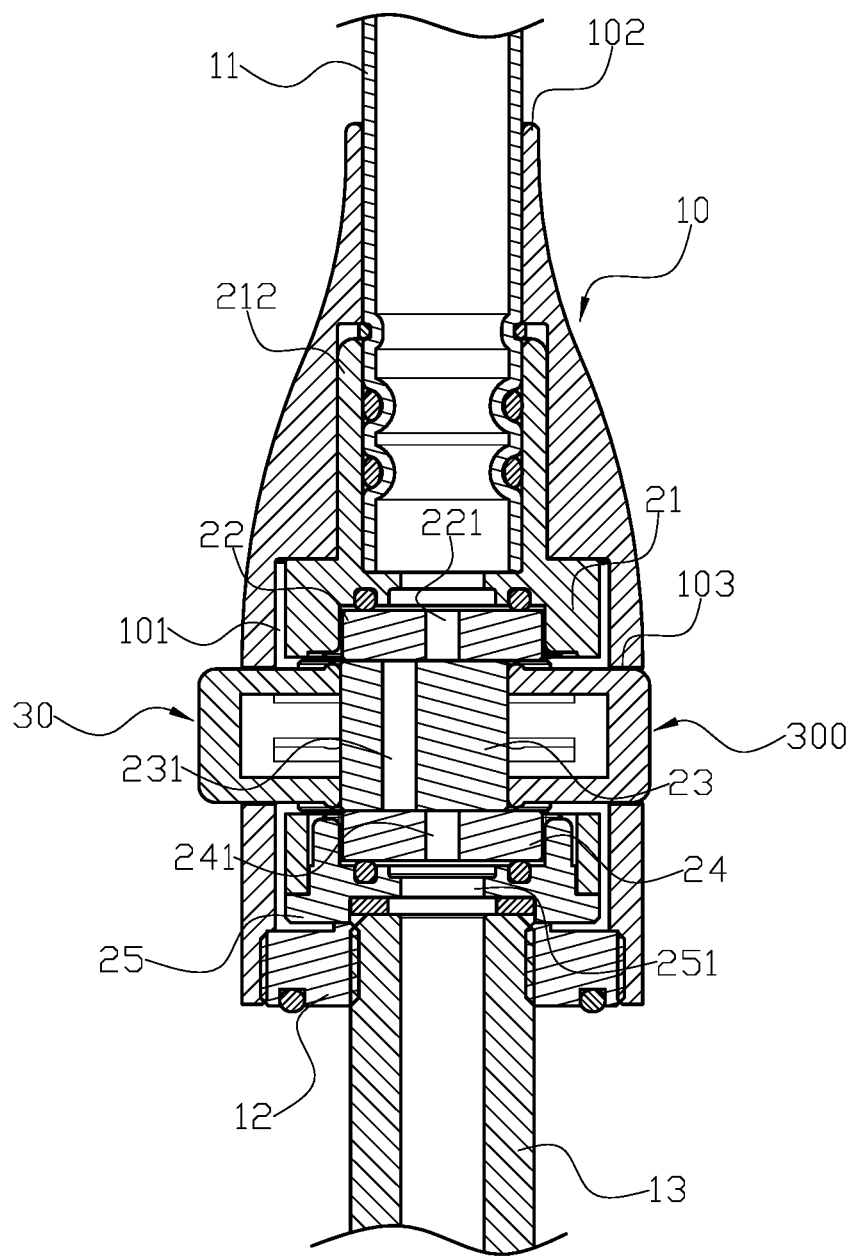
FIG. 4 is a sectional assembly view illustrating the faucet of the present invention is turned off.
Figure 5:
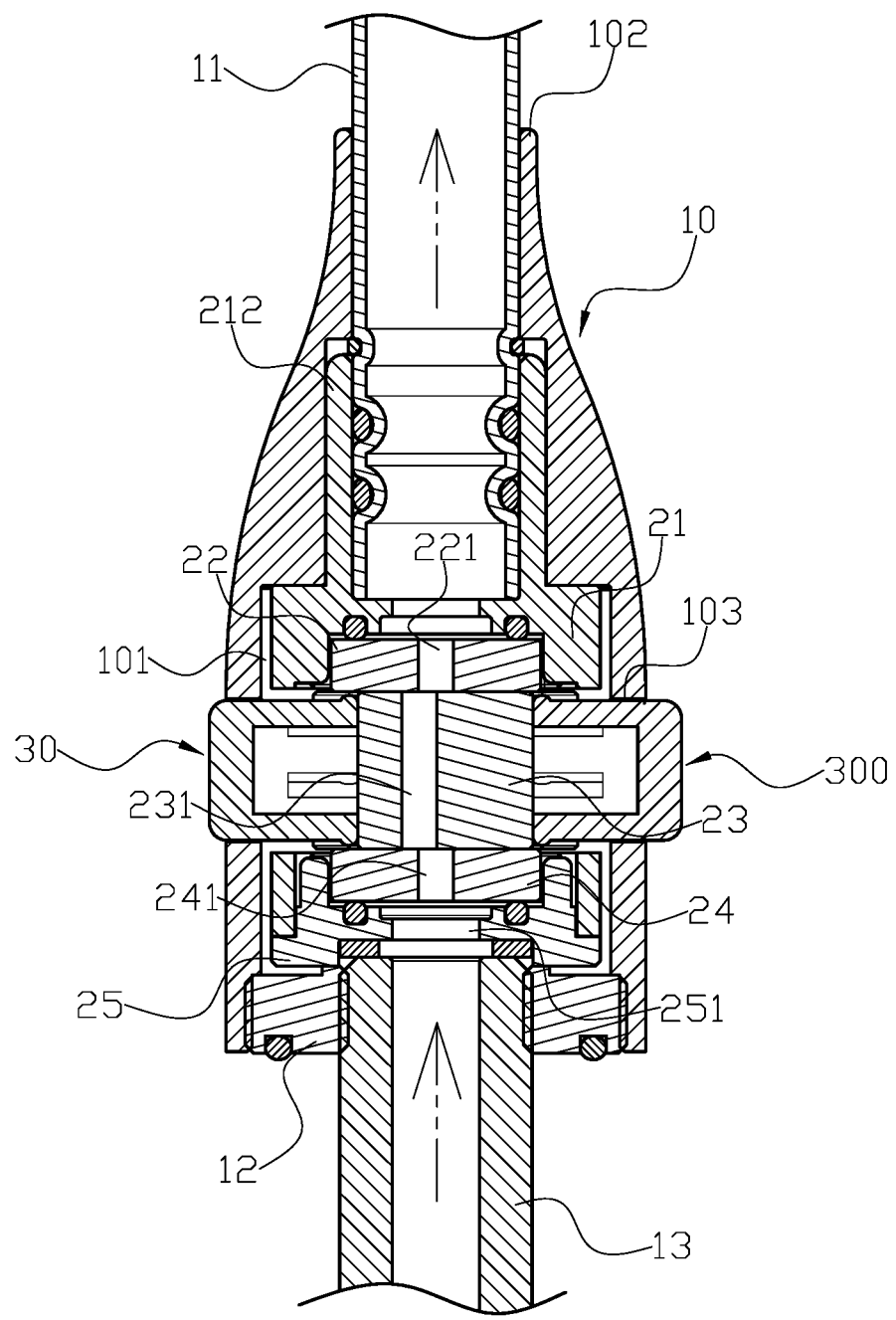
FIG. 5 is a schematic view illustrating the faucet of the present invention is turned on while a water channel of a driving valve piece is partially aligned with a second through hole of a lower fixed valve piece and a third through hole of an upper fixed valve piece.
Figure 6:
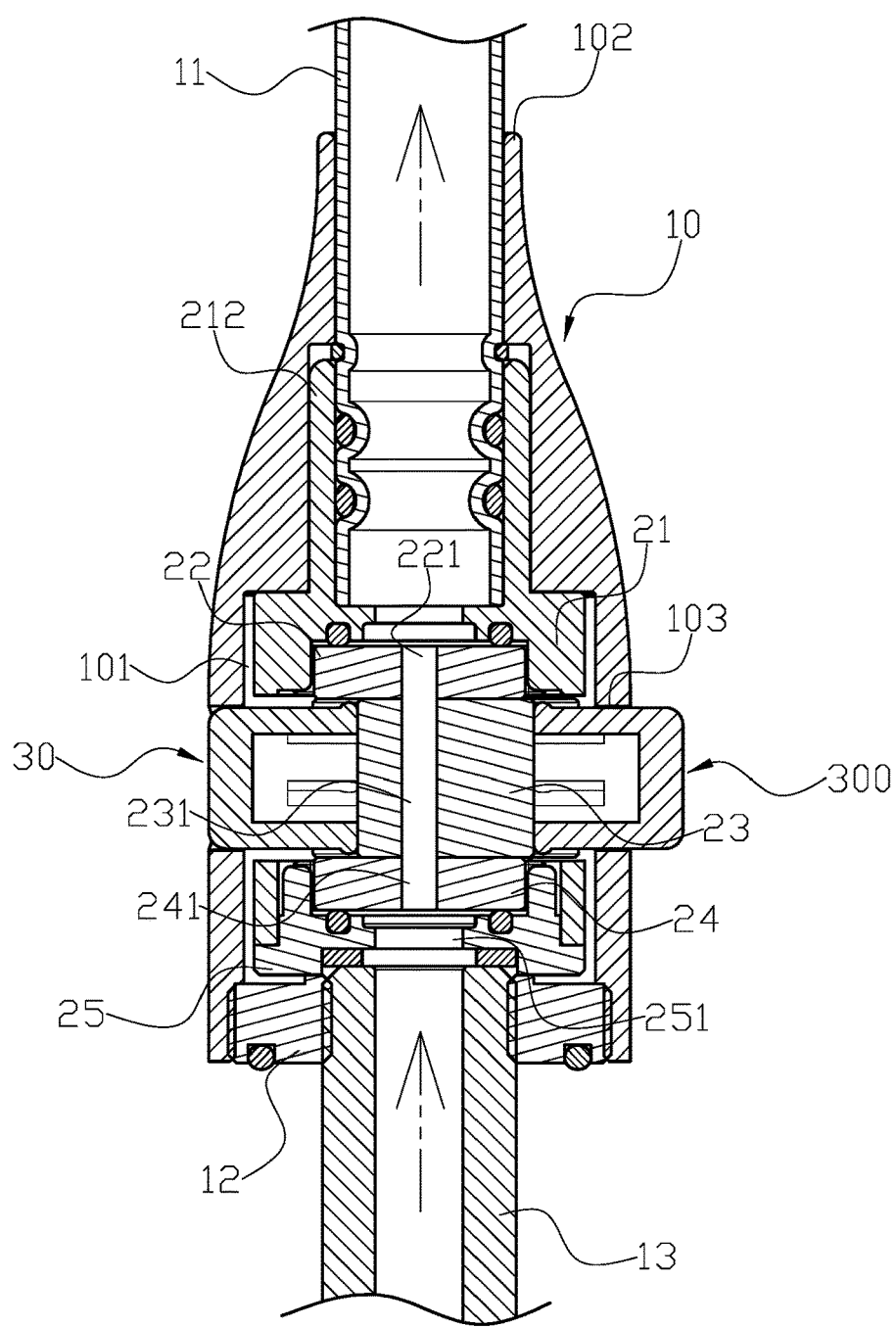
FIG. 6 is a schematic view illustrating the faucet of the present invention is fully turned on while the water channel is completely aligned with the second through hole and the third through hole.
Figure 7:
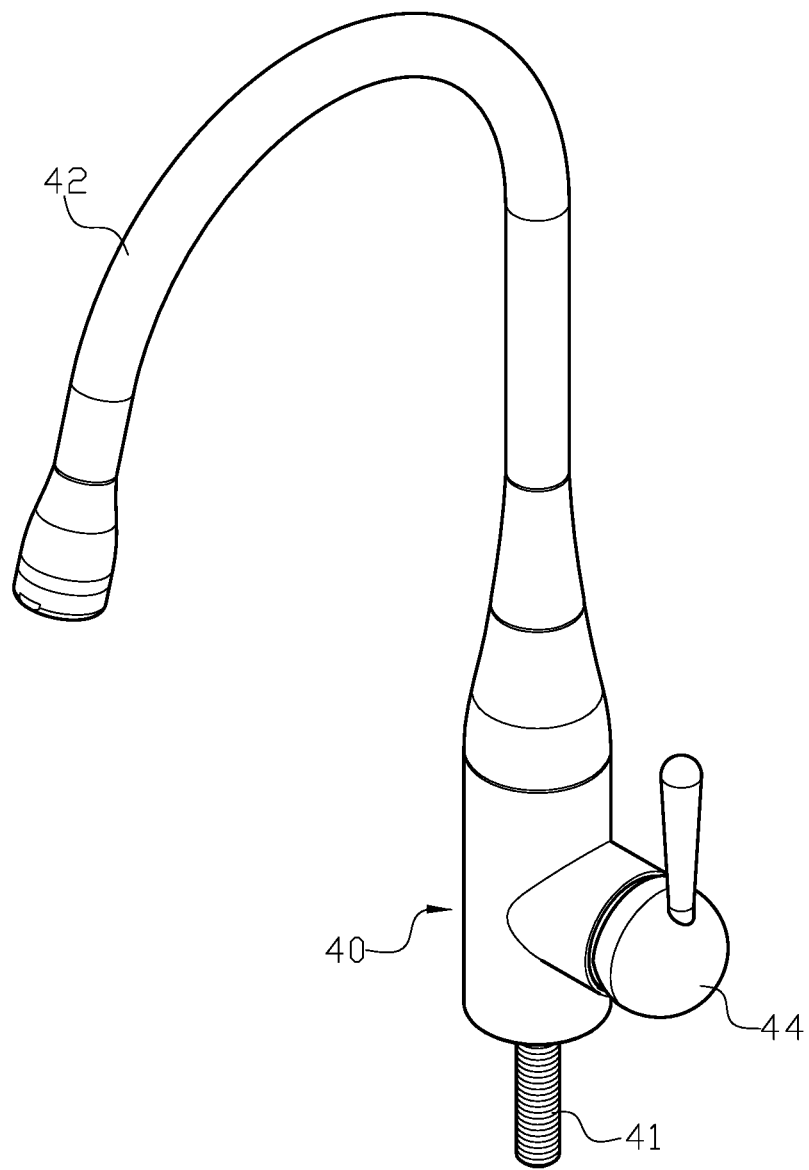
FIG. 7 is a prior art.
Figure 8:
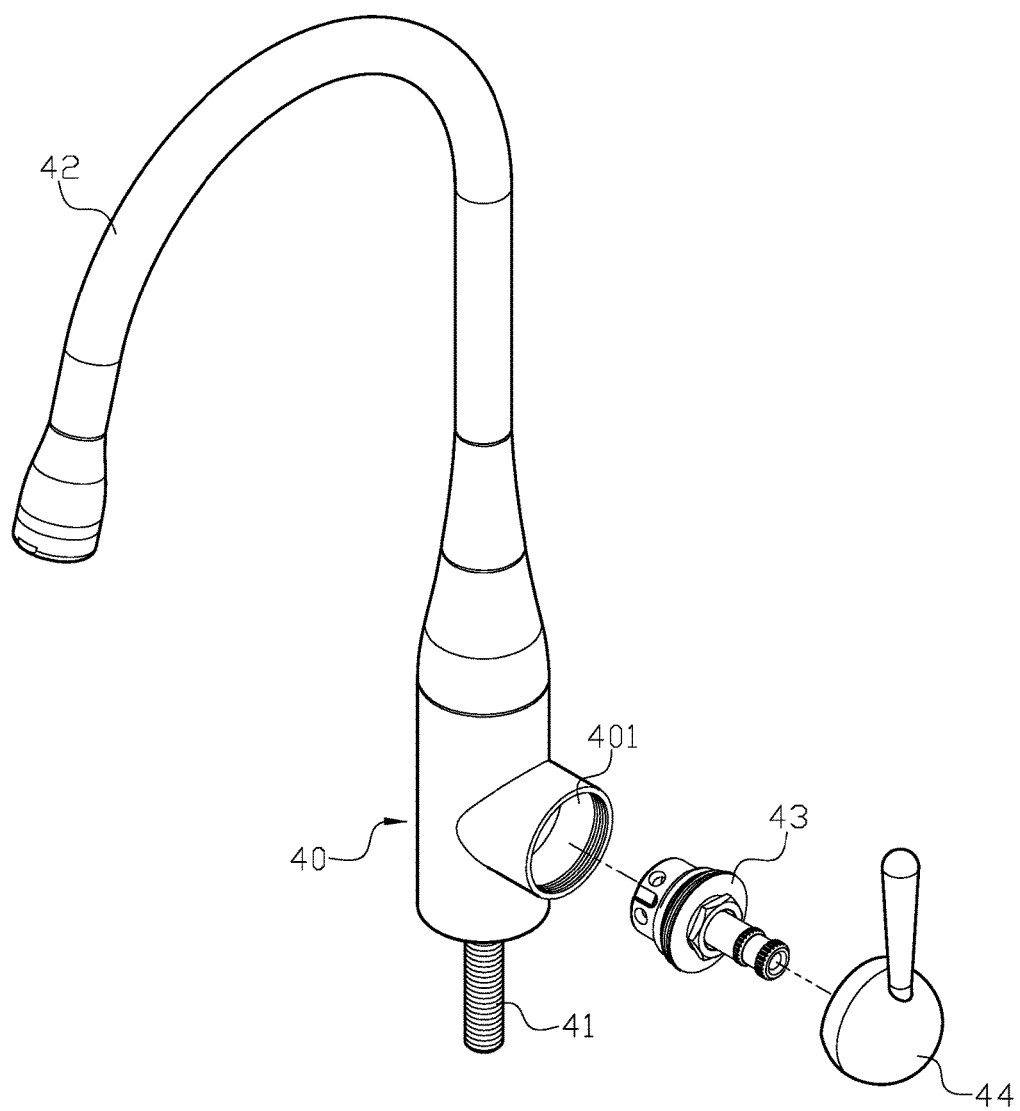
FIG. 8 is a prior art.

In actual application, filtered water is configured to flow from the water inlet tube (13) through the first through hole (251) of the valve base (25), the second through hole (241) of the lower fixed valve piece (24) into the control valve (20). Through pressing the first end (31) of the first press button (30) to push the driving valve piece (23), the water channel (231) of the driving valve piece (23) is gradually aligned with the second through hole (241) of the lower fixed valve piece (24) and the third through hole (221) of the upper fixed valve piece (22). Then, the filtered water can flow through the second through hole (241), the water channel (231), the third through hole (221) and the connecting tube (212) of the valve shell (21), and out of the faucet through the water outlet tube (11) of the main body (10). Through pushing the driving valve piece (23) toward different distances, the water channel (231) can be partially aligned (as shown in FIG. 5) or completely aligned (as shown in FIG. 6) with the second through hole (241) and the third through hole (221), thereby controlling the amount of water flow. Moreover, the faucet of the present invention can be turned off through pressing the second press button (330), and the second press button (33) is configured to push the driving valve piece (23) back to its initial position, and the water channel (231) is misaligned with the second through hole (241) and the third through hole (221) (as shown in FIG. 4) so as to block water flow from the water inlet tube (13) by the driving valve piece (23).

Comparing with conventional faucet, the present invention is advantageous because: the faucet is operated through the first press button (30) and the second press button (300), which reduces space required for installation; (ii) after manufacturing of the main body (10), there is no need to have an additional process for the valve room, which reduces the cost and labor; and (iii) the alignment between the water channel (231) and the second through hole (241) and the third through hole (221) can be achieved through horizontally shifting the driving valve piece (23) such that the manufacturer has no need to accurately calculate the rotation angles between the valve pieces (22)(23)(24), which makes the control valve (20) easier to manufacture.

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A faucet comprising a main body, a control valve, and two press buttons;
   wherein the main body is hollow to form a valve chamber therein, and the control valve is configured to be positioned in the valve chamber; a neck portion having a smaller diameter than the valve chamber is connected to and communicated with an upper end of the valve chamber; a top end of the main body is connected to a water outlet tube, and a lower end of the water outlet tube is configured to axially insert through the neck portion into the valve chamber; after the control valve is positioned in the valve chamber, a locking ring is engaged with and secured at a lower end of the valve chamber, and a water inlet tube is configured to axially penetrate through the locking ring to connect to the control valve; each of two lateral sides of the main body has an installing hole which is communicated with the valve chamber, and the two installing holes located at two corresponding positions are configured to receive and couple with the two press buttons respectively;
   wherein the control valve comprises a valve shell and a valve base which are configured to couple together, and a housing formed inside the valve shell is configured to accommodate an upper fixed valve piece, a driving valve piece and a lower fixed valve piece in sequence; a connecting tube upwardly extending from a top end of the valve shell is communicated with the housing, and each of two lateral sides of the valve shell has an opening, and the two openings are located at two corresponding positions; when the control valve is positioned in the valve chamber, the two openings are respectively aligned with the two installing holes, and the connecting tube is adapted to connect to the water outlet tube which is downwardly inserted into the valve chamber through the neck portion; the upper fixed valve piece is secured in the housing while the lower fixed valve piece is secured at a top surface of the valve base; a first through hole axially penetrates through a central portion of the valve base, and a second through hole and a third through hole respectively and axially penetrate through a central portion of the lower fixed valve piece and a central portion of the upper fixed valve piece, and the first through hole, the second through hole and the third through hole are aligned with each other; the upper fixed valve piece, the driving valve piece and the lower fixed valve piece are stacked in sequence, and the driving valve piece is configured to be located at a position horizontally aligned with the openings; a water channel is configured to axially penetrate through the driving valve piece; and
   wherein each of the two press buttons has a first end and a second end, and an outer periphery of the second end comprises a plurality of positioning portions; the two press buttons are configured to respectively connect to the two installing holes of the main body through the positioning positions on the two second ends thereof; the two press buttons are alternatively pressed through the first ends thereof, and the second end of the pressed press button is configured to pass through the opening at the same lateral side and to push and shift the driving valve piece, which enables the water channel of the driving valve piece to partially align, completely align, or misalign with the second through hole of the lower fixed valve piece and the third through hole of the upper fixed valve piece simultaneously, thereby turning on/off and controlling the water amount of the faucet.

2. The faucet of claim 1, wherein an O-ring and a locating ring are respectively disposed on an outer periphery of the lower end of the water outlet tube, and the locating ring is made of polytetrafluoroethylene (PTFE).

3. The faucet of claim 1, wherein each of the water inlet tube and the locking ring comprises a threaded section, and the water inlet tube and the locking ring are engaged together through the threaded sections thereon.

4. The faucet of claim 1, wherein an outer edge of the upper fixed valve piece has two first flat surfaces and two first recesses, which enable the upper fixed valve piece to be secured in the housing of the valve shell.

5. The faucet of claim 1, wherein an outer edge of the lower fixed valve piece has two second flat surfaces and two second recesses which enable the lower fixed valve piece to be secured at the top surface of the valve base.

6. The faucet of claim 1, wherein the water channel axially penetrating through the driving valve piece is located at a lateral side of a center axis of the driving valve piece.

7. The faucet of claim 1, wherein an outer edge of the driving valve piece has two third recesses at two corresponding positions, and two recess bottoms of the two third recesses are provided to be abutted against by the two second ends of the two press buttons respectively.

8. The faucet of claim 1, wherein three sealing rings are respectively disposed between the valve shell and the upper fixed valve piece, between the lower fixed valve piece and the valve base, and between the valve base and the water inlet tube.

9. The faucet of claim 1, wherein each of the third through hole, the water channel, and the second through hole has an elongate cross section.

10. The faucet of claim 1, wherein each of the two press buttons has a concave axially extending from the second end toward the first end thereof to form the press button in a cap shape, and the positioning portions on the second end are elastic claws.

\* \* \* \* \*